United States Patent [19]

Paulsen

[11] Patent Number: 4,919,500
[45] Date of Patent: Apr. 24, 1990

[54] TORSION BAR SCANNER WITH DAMPING

[75] Inventor: Dean R. Paulsen, Watertown, Mass.

[73] Assignee: General Scanning, Inc., Watertown, Mass.

[21] Appl. No.: 242,789

[22] Filed: Sep. 9, 1988

[51] Int. Cl.$^5$ ............................................. G02B 26/10
[52] U.S. Cl. ................................. 350/6.6; 350/6.91; 350/487; 318/127; 310/321
[58] Field of Search ................ 350/6.6, 6.7, 6.9, 6.91, 350/486, 487; 318/127; 310/36, 320, 321, 326, 327

[56] References Cited

U.S. PATENT DOCUMENTS

| | | | |
|---|---|---|---|
| 3,532,408 | 10/1970 | Dostal | 350/6.6 |
| 3,642,344 | 2/1972 | Corker | 350/6 |
| 3,666,974 | 5/1972 | Dostal | 310/8.2 |
| 3,799,644 | 3/1974 | Street | 350/6.91 |
| 3,921,045 | 11/1975 | Reich et al. | 318/127 |
| 3,959,673 | 5/1976 | Montagu | 350/6.9 |
| 4,037,121 | 7/1977 | Nakamura et al. | 310/8.2 |
| 4,220,885 | 9/1980 | Yamashita et al. | 310/321 |
| 4,317,611 | 3/1982 | Petersen | 350/6.6 |
| 4,321,500 | 3/1982 | Paros et al. | 310/321 |
| 4,502,752 | 3/1985 | Montagu | 350/6.6 |

Primary Examiner—Bruce Y. Arnold
Assistant Examiner—Loha Ben
Attorney, Agent, or Firm—Fish & Richardson

[57] ABSTRACT

A resonant scanner has at least one torsionally rigid damper located at at least one torsional node point of a torsion bar. At least one node of an unwanted vibrational mode is determined to be at a distinct node point, whereby the damper damps the unwanted vibrations while passing desired torsional oscillations. The damper serves as the only physical coupling of the torsion bar to the housing and damps transmission of vibrations into and out of the scanner. One or both ends of the torsion bar may be configured as the rotor of a motor. The rotor fits within but is not physically coupled to a bobbin coupled to the frame. Two coils are wound on the bobbin at approximate right angles to each other to minimize a cross-coupling between the coils.

26 Claims, 2 Drawing Sheets

TORSION BAR SCANNER WITH DAMPING

BACKGROUND OF THE INVENTION

This invention relates to torsion bar resonant scanners.

BACKGROUND

Resonant scanners consist of three basic parts: a torsion spring, an optical element, and a torque-producing element In a typical application, a resonant scanner is used to move a focused beam of light in raster fashion across a light-sensitive surface. The scanner operates as a torsional pendulum, oscillating sinusoidally through a limited angle. The frequency of operation is fixed by the torsional spring rate and the rotational inertia of the rotating parts. The torsion springs used in resonant scanners typically have a high mechanical "Q".

The high energy storage capacity and low rotational inertia of torsion bars allow much higher frequencies to be obtained than with other spring types. However, torsion bars can be perturbed by several unwanted vibratory modes even while performing desirably in a rotational mode. The most common unwanted vibration is a wobble or bending mode which can arise from self-excited cross-axis vibrations. In fact, torsion bars typically have the same high efficiency in bending as they have in torsion such that an optical element supported by torsion bar(s) is only partially constrained to move in a desired torsional mode.

Torsion bar resonant scanners have numerous advantages over other designs, including simplified construction, low power consumption, and being capable of operating at high frequencies. Two known types of torsion bar resonant scanners are those with a central mount between the torsion bar and the housing and those with end mounts between the bar and housing.

Dostal, U.S. Pat. No. 3,666,974, is a center mount type of resonant scanner. Here, a single torsional rod is employed supported at its center by a springy mount, where the sections of the rod on either side of the mount can rotate in opposite phase. The mount is located at a fixed nodal point to effect the highest mechanical coupling between the two oppositely vibrating torsional sections while reducing coupling of torque forces from the rod sections to the supporting frame structure. Thus, very little torque-induced vibration is intended to be transmitted to the frame, thereby sustaining the efficiency of the system.

Corker, U.S. Pat. No. 3,642,344, is an end-mount type of torsional oscillator having a torsion rod whose ends are connected to a frame through a pair of flexural members. This arrangement will have two resonant frequencies. When the device is driven at the higher resonant frequency, the mirror on the torsion bar and the rotors at the end of the torsion bar will oscillate with opposite phase, causing a pair of nodes to appear on the torsion rod between the mirror and the rotors at points dependent upon relative moments of inertia of the mirror and the rotors. By eliminating a center mount, Corker seeks to avoid damping of desired oscillations of the torsion rod while also avoiding transmission of vibrations from the rod to the device in which the scanner is mounted. In Corker's arrangement, counterload members at the far ends of the torsion rod act as rotors which are driven according to an amplified signal derived from a pickup at the oscillating mirror.

SUMMARY OF THE INVENTION

One aspect of the present invention provides a method for isolating the spring of a resonant scanner by:
(1) defining at least one node point R on the spring for a rotational frequency $f_R$,
(2) defining at least one node point V on the spring for a vibrational frequency $f_V$, and
(3) locating at least one damper on the spring at point R at some distance from point V, the damper internally capable of damping transmission of vibrations at frequency $f_V$.

In one embodiment of the present invention, the scanner includes a damper scheme on a torsion bar of a torsional oscillator where undesired vibrational modes are damped without impeding desired rotational oscillations. The torsion bar is physically coupled to the oscillator housing only via the damper scheme.

In some embodiments of the invention, a torsionally rigid damper is located at the torsional node of a torsion bar having a mirror mount at one end of the bar and a source of torque at the other end. Alternatively, two dampers are located at respective torsional nodes located on either side of a mirror mount on a symmetrical torsion bar having at least one counterweight located at an end of the bar.

In one embodiment, a housing for the torsion bar is provided. The housing defines a chamber, where a damper assembly having a buffer insert with two damper rings is mounted in the chamber. The torsion bar defines a first seat, the first damper ring being mounted on the seat and mating with an inside wall of a sleeve. An outside wall of the sleeve mates with an inside wall of the buffer insert. An outside wall of the buffer insert mates with an inside wall of the housing chamber. The sleeve also defines a second seat, and the second ring is seated in the second seat, mating with the inside wall of the chamber.

A feature of the present invention is the ability to locate a torsionally rigid damper on the torsion rod of a resonant scanner at a point (a) where there is no substantial rotation of the rod when it is placed under torsion and (b) where there will be substantial perturbation from other vibrational modes. This damper is the only physical coupling between the torsion rod and housing. The damper thus provides maximal torsional coupling along the torsion bar, while also acting as a damper to unwanted vibrations on the torsion bar and at the sam time providing minimal coupling on the torsion bar from and to the external environment. The damper may be made of viscoelastic material.

In another aspect of the invention, a counterweight on the end of the torsion bar acts as a rotor of a two coil motor, where the first coil drives the motor and the second coil senses rotor velocity. In one embodiment of the invention, a torsion bar scanner includes a sensing coil, a drive coil, and a bobbin having an open center, the bobbin mountable to the scanner housing, the coils wound on the bobbin approximately at right angles to each other, with the counterweight on the torsion bar defining the rotor and capable of fitting within the bobbin open center.

One feature of this coil arrangement is that the coils and rotor can act as a source of torque. A further feature of this coil arrangement is that minimal electrical coupling occurs between the two coils, while no physical coupling is required between the coils and the torsion bar.

In another aspect of the invention, defining at least one node point for a desired rotational frequency at a location other than the node point of unwanted cross-axis vibration includes solving the following equations for N to locate at least one desired node point and then again to locate at least one undesired node at a point distinct from the desired node point, where N equals the location of a given node measured from the mirror:

$$A = \frac{F}{EI}\left(\frac{L^2}{2} + aL\right) + \frac{ML}{EI},$$

$$Y2 = \frac{F}{EI}\left(\frac{L^3}{3} + aL^2 + a^2L\right) +$$

$$\frac{M}{EI}\left(\frac{L^2}{2} + aL\right) + Y1,$$

$$F = (2\pi f)^2 Y2 m2 = -(2\pi f)^2 Y1 m1,$$

$$M = (2\pi f)^2 AJ, \text{ and}$$

$$0 = \left(\frac{FN^3}{3} + \frac{MN^2}{2} + f(L - N + a)\frac{N^2}{2}\right)\left(\frac{1}{EI}\right) +$$

$$Y1, \text{ and}$$

where:
A = angular deflection of magnet from rest position,
F = the reaction force at the magnet center of gravity,
M = total moment at magnet end of torsion bar,
Y1 = displacement of mirror from rest position,
Y2 = displacement of magnet from rest position,
a = the distance from the magnet center of gravity to the torsion bar end,
L = the total length of torsion bar between the mirror and magnet,
m1 = ½ mass of optical element,
m2 = mass of counterweight,
J = rotational inertia of counterweight at right angles to torsion bar axis,
E = Young's modulus, and
I = the area moment of inertia of the torsion bar.

In yet another aspect of the invention, a resonant rotational mechanical system includes a torsional spring mounted on a frame, a mass being supported on the spring for rotational motion in a desired rotational mode, where no substantial rotation occurs at a first node along the length of the torsional spring, the rotational mechanical system having an undesired mode of possible resonant motion in which no resonant motion occurs at a second node spaced apart from the first node, the first node being held in a damper capable of damping resonant motion of the undesired mode, whereby motion in the undesired mode is substantially prevented while rotation in the desired mode is substantially undamped.

Other advantages and features will become apparent from the following description of the preferred embodiment and from the claims.

DESCRIPTION OF THE PREFERRED EMBODIMENTS

Figure 1:
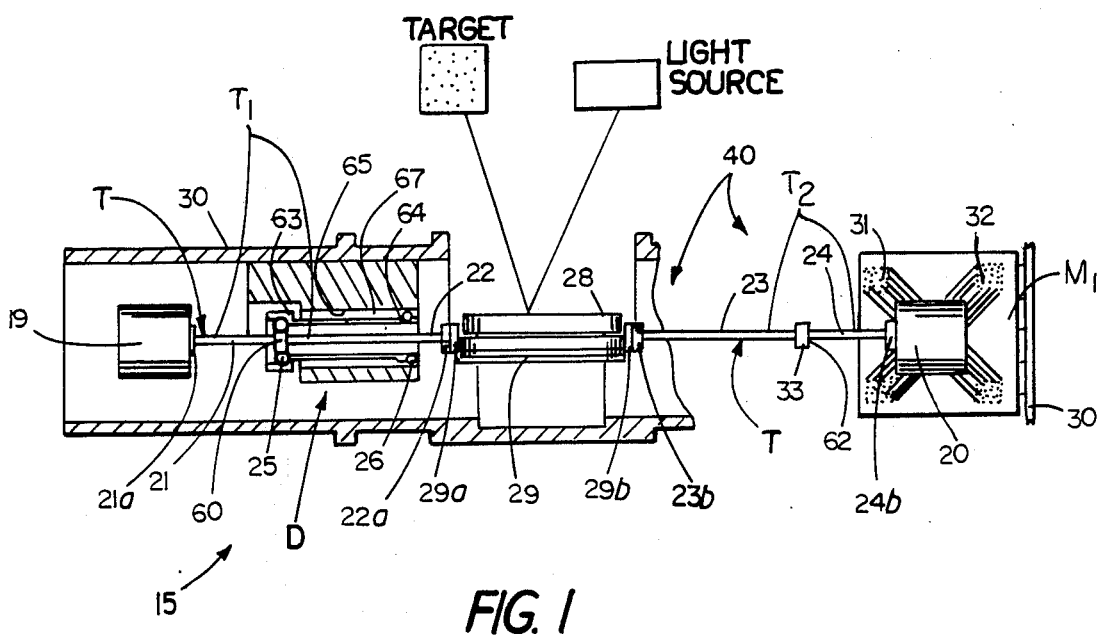
FIG. 1 is a partial side cross-sectional view of a preferred embodiment of the present invention.

It will be appreciated by those skilled in the art that in operation of a resonant scanner, a beam of information-carrying light from a source can be controllably reflected from the surface of a mirror to scan a target in a desired raster fashion. This feature will be appreciated with reference to FIG. 1, where a resonant scanner 15 includes a frame 30 within which is housed an oscillator assembly 40. The oscillator assembly includes a mirror 28 and it is from the surface of this mirror that the light source beam can be caused to scan the target surface in raster fashion.

Assembly 40 includes two counterweights 19 and 20 located at respective ends of torsion bar T. Torsion bar T is comprised of four spring elements 21, 22, 23 and 24, where elements 21 and 22 define a single spring rod $T_1$ and elements 23 and 24 likewise define a single spring rod $T_2$. Two damper mounts 60 and 62 are defined upon rods $T_1$ and $T_2$, respectively.

Mirror mount 29 is milled from a segment of spring material (e.g. Titanium) such that when mirror 28 is affixed to mount 29 a radial balance and symmetry can be achieved for torsion rod T Mount 29 is torsionally rigid and is provided with first and second mounting posts 29a and 29b. These mounting posts are preferably integral flanges of the mirror mount and serve to receive and cooperate with mounting posts 22a and 23b of rod segments 22 and 23, respectively. Furthermore, the respective pairs of mounting posts 22a and 29a and 29b and 23b are coupled together (such as with Amicon G-513 epoxy) whereby rods $T_1$ and $T_2$ are effectively rigidly coupled via torsionally rigid mirror mount 29. Also defined at the ends of torsion bar T are mounting posts 21a and 24b, to each of which is mounted in a like manner a respective counterweight 19 and 20.

Figure 2:
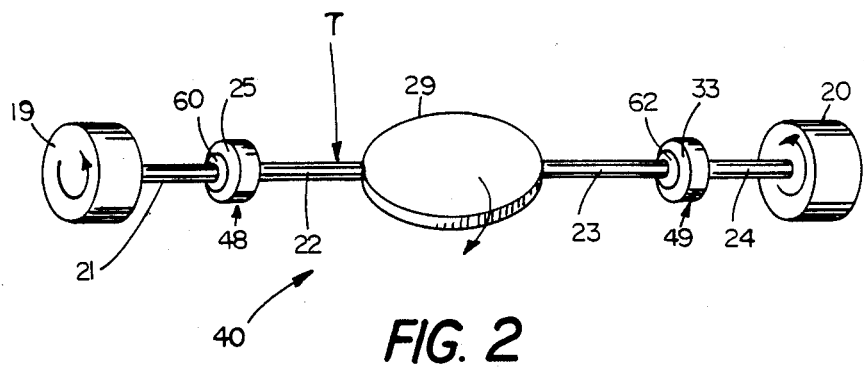
FIG. 2 is a conceptual view of an oscillator assembly 40.

Referring to FIG. 2, it will be appreciated that damper mounts 60 and 62 are defined on torsion bar T for mounting of dampers 25 and 33, respectively. Assembly 40 is intended to be mounted to a housing via dampers 25 and 33, although such connection is not shown in FIG. 2. Dampers 25 and 33 will be located at torsional node points 48 and 49, respectively, for the desired torsional oscillation frequency of the scanner, as later described.

When adequate torquing is imparted upon assembly 40, such as where one or both counterweights is appropriately driven as the rotor of an electric motor, then a desired oscillation pattern to accomplish the desired raster scan pattern may be established where mirror 28 will torsionally oscillate in phase opposite to that of the counterweights 19 and 20. In such case, the desired nodes of such oscillation may be established at points 48 and 49.

As seen in FIG. 1, counterweight 20 serves the added function of a rotor of an electric motor $M_1$. Motor $M_1$ is mounted on frame 30, but is physically uncoupled from rotor 20. As a result, the only physical communication between the oscillator and frame (and therefore the external world) is via the two dampers.

More particular attention will now be paid to the damping arrangement of FIG. 1, with specific reference to damper assembly D. Here, assembly A will include an O-ring 25 mounted on damper mount 60, this subassembly then being snuggly seated within the interior of a first end of an aluminum sleeve 63. Sleeve 63 is firmly seated within a buffer insert, such as foam sleeve 67. Buffer 67 in turn is firmly mounted within housing 30 on housing interior wall 65. Defined at the outer periphery of a second end of sleeve 63 is a mount 64 for receipt of O-ring 26. Thus mounted, O-ring 26 fits snuggly between mount 64 and the interior wall 65 of frame 30. In such configuration, the O-rings 25 and 26 and buffer 67 each preferably will be made from a damping material. Hence, vibrational communication between torsion bar T and the outside world will be at a minimum, although torsion bar T remains torsionally responsive. A second damper assembly is located at damper mount 62, but is not shown in detail in FIG. 1.

Figure 3:
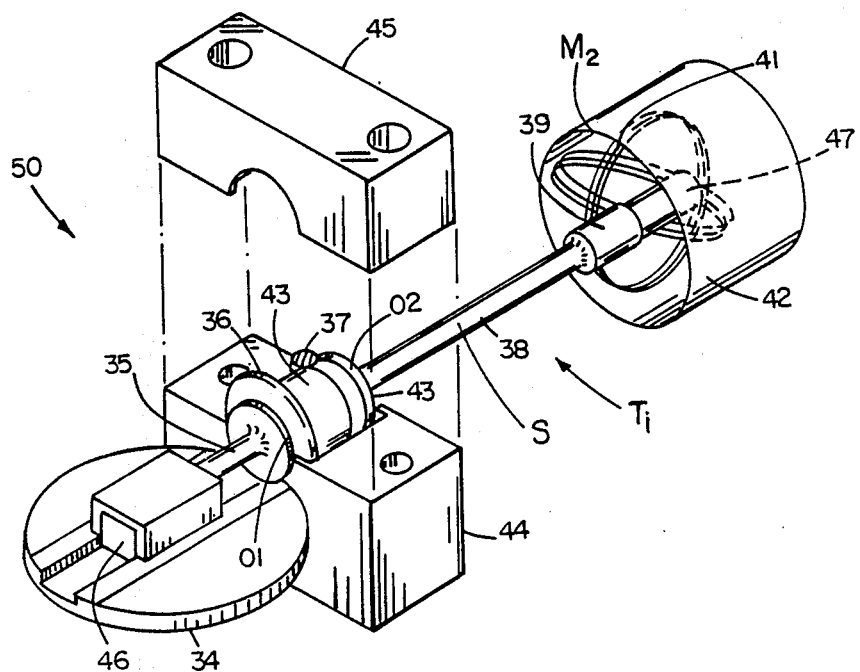
FIG. 3 is a perspective view of an alternative embodiment of the invention.

Turning now to FIG. 3, an alternative torsional oscillator 50 includes a torsion bar $T_i$ having two spring elements 35 and 38 turned from a single metal shaft S. A mirror mount 46 is defined at one end of the shaft, and to which mirror 34 is affixed. Shaft S also defines an enlarged mount 43 coupled to mirror mount 46 by short spring element 35. Mount 43 defines a first seat O1 and a second seat O2 for placement of appropriate damper material, such as O-rings 36 and 37, respectively. Mount 43 is preferably sufficiently rigid in torsion such that there is no significant differential rotation between O-rings 36 and 37 when a torque is applied to Torsion bar $T_i$.

Shaft S also defines elongated spring element 38 coupled to mount 43 distal to short element 35 and terminating in an enlarged radius coupling 39. Coupling 39 enables attachment of a magnetic pole piece 47 so to render this end of shaft S into a rotor of a motor $M_2$. Two cooperating housing pieces 44 and 45 clamp together over and in cooperation with mount 43 and dampers 36 and 37 to provide a torsionally stable mount for the scanner. It will be appreciated that the housing pieces and motor are coupled to a common frame, although the frame is not shown in FIG. 4.

In operation of this embodiment, motor $M_2$ will drive bar S at a reciprocating frequency such that the mirror and rotor establish opposite phases of oscillation, and where the torsional node for the desired frequency of oscillation will be located at mount 43. Hence this embodiment will enjoy damped coupling to the housing, without limitation of desired torsional oscillation.

Ordinarily, a scanner, such as the types described above, will be provided with a sensor for accurate determination of scanner drive signals. Motors $M_1$ and $M_2$ have been shown having a drive coil 31 or 41 and a sensing coil 32 or 42, respectively. In such arrangement, the sensing coil will continuously sense rotor velocity, whereby a signal can be applied to a controller unit to determine the drive signal to be applied to the drive coil.

Figure 4:
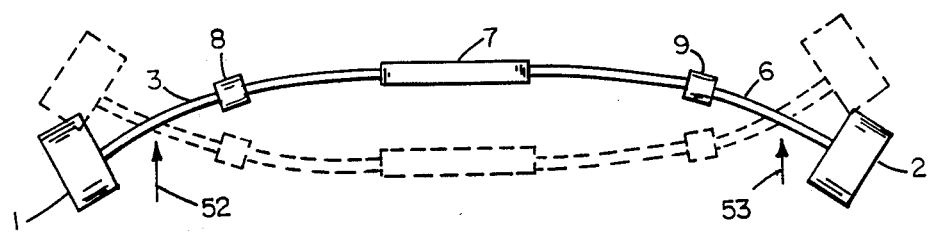
FIG. 4 is a top view of oscillator assembly 40.

Coils 31 and 32 (or 41 and 42) are wound on a single bobbin with the two coils essentially at right angles to each other. Coil 31 may then act as the drive and coil 32 may act as the sensor. This arrangement minimizes coupling between the drive and sensing coils, thus yielding a more accurate sensing signal from coil 32, reflective of actual rotor velocity. As a result, the scanner may be driven more accurately. In fact, where the velocity signal sensed by the sensing coil is fed back to a suitable amplifier, the oscillator may be driven to self-oscillate at a desired frequency. A scanner as shown in FIG. 1 can be designed to oscillate such as at 200 hertz through an angle of 30 degrees peak-to-peak. A scanner as shown in FIG. 4 can be designed to oscillate such as at 12,000 hertz through a 2 degree angle peak-to-peak. However, oscillation frequency (and angular displacement) is merely a matter of design choice, as further explained below.

A resonant scanner torsion bar is subject to disturbance from various vibrational modes at both low and high frequencies. For example, external environmental vibrations (such as where the equipment housing is bumped by the user) or internal discontinuities (such as where the counterweights begin to oscillate in opposed directions) may degrade system performance. It is possible for the torsion bar to deform, for example in a bending mode, even while the generally desired oscillation pattern is being followed. This bending mode is often found to be of a low frequency and at such amplitude as to be the most serious perturbing influence of the various unwanted vibrations sought to be avoided.

Referring to FIG. 4, nodes 52 and 53 of an undesired cross-axis (bending) vibration mode are illustrated. By appropriate design of torsion bar T, nodes 52 and 53 can be made to occur respectively at distinct and offset locations from the node points 48 and 49 (see FIG. 2) of the desired torsional nodes. It is based upon this observation that placement of dampers 25 and 33 becomes important.

More particularly, if the desired nodes of the torsional mode occur at node points 48 and 49, and if nodes 52 and 53 of the unwanted translational (bending) mode occur at locations on torsion bar T other than at node points 48 and 49, then placement of dampers 25 and 33 at node points 48 and 49 will enable maximal torsional coupling between elements of the torsion rod, but will damp and constrain the cross-axis wobble of the translational mode. A like function will follow as to any other unwanted vibrational mode if its nodes are located separate from nodes 48 and 49.

It will now be appreciated that where appropriate material is used for dampers 25 and 33, undesired vibrations can be damped on a torsional scanner, including perturbations from the external environment. These perturbations are isolated from the torsion bar in the present design as a result of having damped mounting of the assembly 40 to frame 30 only via dampers 25 and 33. Therefore, dampers 25 and 33 are preferably formed out of a damping rubber or a viscoelastic polymer, such as Scotchdamp SJ2015X made by 3M Company, or of similar products.

Determination of the appropriate location of a torsional node point can be made by trial and error. The key to keep in mind is that the greatest mechanical advantage should be sought and will be achieved where the desired and undesired node points are maximally separated on the torsion rod. The optimal location of the desired torsional node(s) or undesired bending (and perhaps other) node(s) can be computed by means of solving the equations below for N for each node location for a particular mode of interest, where N is the location of the node measured from the location of the mirror:

$$A = \frac{F}{EI}\left(\frac{L^2}{2} + aL\right) + \frac{ML}{EI},$$

$$Y_2 = \frac{F}{EI}\left(\frac{L^3}{3} + aL^2 + a^2L\right) +$$

-continued $$\frac{M}{EI}\left(\frac{L^2}{2} + aL\right) + Y1,$$

$$F = (2\pi f)^2 Y2m2 = -(2\pi f)^2 Y1m1,$$

$$M = (2\pi f)^2 AJ, \text{ and}$$

$$O = \left(\frac{FN^3}{3} + \frac{MN^2}{2} + f(L - N + a)\frac{N^2}{2}\right)\left(\frac{1}{EI}\right) + Y1,$$

where,
A = angular deflection of the magnet from rest position,
F = the reaction force at the magnet center of gravity,
M = total moment at the magnet end of the torsion bar,
Y1 = displacement of the mirror from rest position,
Y2 = displacement of the magnet from rest position,
a = the distance from the magnet center of gravity to the torsion bar end,
L = the total length of the torsion bar between the mirror and the magnet,
m1 = ½ mass of the optical element,
m2 = mass of the counterweight,
J = rotational inertia of the counterweight at right angles to torsion bar axis,
E = Young's modulus, and
I = the area moment of inertia of the torsion bar.

In computation of location of a torsional node, the frequency of torsional oscillation must be kept the same for the structures on either side of the torsional node. The frequency can be calculated according to the following equation:

$$f = \frac{1}{2\pi}\sqrt{K/P},$$

where,
f = frequency in hertz,
K = the torsional spring rate, and
P = the rotational inertial of the mirror or magnet.

Also, the torques on either side of a node must be equal. The equation for torque is:

$$T = P(2\pi f)^2 \theta,$$

where,
$\theta$ = deflection angle from center, and
T = torque in dyne-centimeters.

In an embodiment of the inventive scanner of FIG. 1, where counterweight 20 was designed of magnetic material so as to be able to act as a rotor, torsion rod segments 22 and 23 were chosen to have a 0.0313" diameter and a 0.878" length, and torsion rod segments 21 and 24 were chosen to have the same diameter at a length of 0.439", with the mounts located in between these bar sections (thus locating the torsional nodes at mounts 60 and 62). The magnet was selected to have a 0.469" diameter and a 0.487" length. The mirror was chosen to have a 0.99" diameter (fused quartz). The distance from the magnet center of gravity to the torsion bar end was 0.293". The total length of the torsion bar between the mirror and the magnet was 1.317". The ½ mass of the optical element was 3.80 g. The mass of counterweight 19 was 10.37 g. The rotational inertia of the counterweight at right angles to torsion bar axis was 2.286 g-cm². Young's modulus was $3 \times 10^7$ psi. Drive coil 47 was made from #29 wire and sensing coil 41 was made from #29 wire, each with 100 turns.

By dint of the above equations, a scanner having such dimensions was determined to have a bending node separated by 0.44" from the desired torsional node. The frequency of cross resonance was calculated to be 38 hz. Trace-to-trace wobble, which is a measure of the maximum separation between lines that are scanned in the same direction, measured with the scanner running at 60 degrees peak-to-peak optical, was about ½ arc-second over a measurement period of ten seconds.

Other embodiments are within the following claims.
What is claimed is:

1. A scanner comprising:
   a first spring,
   at least one node point R defined on said first spring for a rotational frequency $f_R$,
   at least one node point V defined on said first spring for a vibrational frequency $f_V$, and
   at least one first damper, said damper located on said first spring at point R at some distance from point V, said damper configured to substantially impede transmission of vibrations at said frequency $f_v$.

2. The scanner of claim 1, further comprising a housing, said first spring physically coupled to said housing only through said first damper, said first damper being transmissive to torsional oscillations of said first spring at said rotational frequency $f_R$.

3. The scanner of claim 1, wherein said first spring node point R comprises a first damper mount to which said first damper is affixed.

4. The scanner of claim 1, further comprising a first source of torque coupled to said first spring having at least one counterweight.

5. The scanner of claim 4, further comprising a first load mount, said mount located on a first side of point R and said at least one counterweight located on a second side of point R on said first spring.

6. The scanner of claim 4, further comprising a sensing coil, a drive coil, and a bobbin having an open center, said bobbin mountable to a housing, said coils wound on said bobbin approximately at right angles to each other, said counterweight defining a rotor and capable of fitting within said bobbin open center, whereby said coils and rotor can act as a motor.

7. The scanner of claim 1, wherein said first damper is comprised of viscoelastic material.

8. The scanner of claim 1, further comprising a housing, said housing defining a first chamber therein, said first damper comprising a first buffer insert, first and second damper rings, and a first collar, said first spring defining a first seat, said first damper ring mounted on said first seat, said first ring mating with an inside wall of said first collar, an outside wall of said first collar mating with an inside wall of said first buffer insert, an outside wall of said first buffer insert mating with an inside wall of said first chamber, said first roller defining a second seat, said second ring seated in said second seat and mating with said inside wall of said first chamber.

9. The scanner of claim 8, further comprising a first source of torque coupled to said first spring having at least one counterweight.

10. The scanner of claim 9, further comprising a sensing coil, a drive coil, and a bobbin having an open center, said bobbin mountable to the housing, said coils wound on said bobbin approximately at right angles to each other, said counterweight defining a rotor and capable of fitting within said bobbin open center, whereby said coils and rotor can act as a motor.

11. The scanner of claim 8, wherein said first spring is a torsion rod.

12. The scanner of claim 8, further comprising a first load mount, said mount located on a first side of point R and said at least one counterweight located on a second side of point R on said first spring.

13. The scanner of claim 8, further comprising:
a second spring,
at least one node point defined on said second spring for said rotational frequency $f_R$,
at least one node point defined on said second spring for said vibrational frequency $f_v$, and
at least one second damper located on said second spring at point R at some distance from point V, said second damper configured to substantially impede transmission of vibrations at said frequency $f_v$.

14. The scanner of claim 13, wherein said second spring is physically coupled to said housing only through said second damper, said second damper being transmissive to torsional oscillations of said spring at said rotational frequency $f_R$.

15. The scanner of claim 14, said housing further comprising a second chamber, said second damper comprising a second buffer insert, first and second additional damper rings and a second collar, said second spring defining a first additional seat, said first additional damper ring mounted on said second spring first additional seat, said first additional ring mating with an inside wall of said second collar, an outside wall of said second collar mating with an inside wall of said second buffer insert, an outside wall of said second buffer insert mating with an inside wall of said second chamber, said second collar defining a second additional seat, said second additional ring seated in said second collar second additional seat and mating with said inside wall of said second chamber.

16. The scanner of claim 15, wherein said first and second springs are physically coupled to said housing only through said first and second dampers, said first and second dampers being transmissive to torsional oscillations of said springs at said rotational frequency $f_R$.

17. The scanner of claim 15, further comprising a source of torque coupled to either of said springs, and a counterweight coupled to either of said springs.

18. The scanner of claim 1, wherein said first spring is a torsion rod.

19. A scanner comprising:
a spring having at least a first axis and disposed to be torqued about said axis,
at least one damper, said damper located on said spring at a point where there is no substantial rotation of said spring if said spring were to be torqued about said axis, and
a housing, wherein
said damper is coupled to said housing and configured to substantially impede transmission of vibrations from said spring to said housing and from said housing to said spring.

20. The scanner of claim 19, further comprising a source of torque coupled to said spring and a mount located on said spring, wherein said source is located distal to said damper and said mount is located proximal to said damper.

21. The scanner of claim 20, wherein said source comprises a counterweight, said scanner further comprising a sensing coil, a drive coil, and a bobbin having an open center, said bobbin mountable to said housing, said coils wound on said bobbin approximately at right angles to each other, said counterweight defining a rotor and capable of fitting within said bobbin open center, whereby said coils and rotor can acts as a motor to provide a source of torque coupled to said spring.

22. The scanner of claim 19, wherein said damper is a viscoelastic material.

23. A method for isolating perturbations from the spring of a resonant scanner comprising the steps of:
(1) providing at least one node point R on said spring for a rotational frequency $f_R$,
(2) providing at least one node point V on said spring for a vibrational frequency $f_V$, and
(3) providing at least one damper on said spring at point R at some distance from point V, said damper configured to substantially impede transmission of vibrations at said frequency $f_v$.

24. The method of claim 23, wherein step (1) comprises solving the following equations for N:

$$A = \frac{F}{EI}\left(\frac{L^2}{2} + aL\right) + \frac{ML}{EI},$$

$$Y2 = \frac{F}{EI}\left(\frac{L^3}{3} + aL^2 + a^2L\right) +$$

$$\frac{M}{EI}\left(\frac{L^2}{2} + aL\right) + Y1,$$

$$[F = (2\pi f)^{23} Y2m2 = -(2\pi f)^2 Y1m1^2,]$$

$$F = (2\pi f)^2 Y2m2 = -(2\pi f)^2 Y1m1,$$

$$M = (2\pi f)^2 AJ,$$

$$0 = \left(\frac{FN^3}{3} + \frac{MN^2}{2} + f(L - N + a)\frac{N^2}{2}\right)\left(\frac{1}{EI}\right) + Y1,$$

where,
A = angular deflection of magnet from rest position,
F = the reaction force at the magnet center of gravity,
M = total moment at magnet end of torsion bar,
Y1 = displacement of mirror from rest position,
Y2 = displacement of magnet from rest position,
a = the distance from the magnet center of gravity to the torsion bar end,
N = location of node measured from mirror,
L = the total length of torsion bar between the mirror and magnet,
m1 = ½ mass of optical element,
m2 = mass of counterweight,
J = rotational inertia of counterweight at right angles to torsion bar axis,
E = Young's modulus, and
I = the area moment of inertia of the torsion bar.

25. The method of claim 23, wherein step (2) comprises solving the following equations for N:

$$A = \frac{F}{EI}\left(\frac{L^2}{2} + aL\right) + \frac{ML}{EI},$$

-continued $$Y2 = \frac{F}{EI}\left(\frac{L^3}{3} + aL^2 + a^2L\right) + \frac{M}{EI}\left(\frac{L^2}{2} + aL\right) + Y1,$$

$$[F = (2\pi f)^{23} Y2m2 = -(2\pi f)^2 Y1 m1^2,]$$

$$F = (2\pi f)^2 Y2m2 = -(2\pi f)^2 Y1 m1,$$

$$M = (2\pi f)^2 AJ,$$

$$O = \left(\frac{FN^3}{3} + \frac{MN^2}{2} + f(L - N + a)\frac{N^2}{2}\right)\left(\frac{1}{EI}\right) + Y1,$$

where,
A = angular deflection of magnet from rest position,
F = the reaction force at the magnet center of gravity,
M = total moment at magnet end of torsion bar,
Y1 = displacement of mirror from rest position,
Y2 = displacement of magnet from rest position,
a = the distance from the magnet center of gravity to the torsion bar end,
N = location of node measured from mirror,
L = the total length of torsion bar between the mirror and magnet,
m1 = ½ mass of optical element,
m2 = mass of counterweight,
J = rotational inertia of counterweight at right angles to torsion bar axis,
E = Young's modulus, and
I = the area moment of inertia of the torsion bar.

26. A resonant rotational mechanical system, comprising:

a torsional spring mounted on a base;

a mass supported on said spring for rotational motion in a desired rotational mode in which no substantial rotation occurs at a first node along the length of said torsional spring;

said rotational mechanical system having an undesired mode of possible resonant motion in which no resonant motion occurs at a second node spaced apart from said first node; and said first node being held in a damper configured to substantially impede transmission of resonant motion of said undesired mode, whereby motion in said undesired mode is substantially prevented while rotation in said desired mode is substantially undamped.

* * * * *

UNITED STATES PATENT AND TRADEMARK OFFICE
CERTIFICATE OF CORRECTION

PATENT NO. : 4,919,500
DATED : April 24, 1990
INVENTOR(S) : Dean R. Paulsen

It is certified that error appears in the above-identified patent and that said Letters Patent is hereby corrected as shown below:

Col. 1, line 11; insert --.-- after "element";

Col. 2, line 48; change "sam" to --same--;

Col. 4, line 27; insert --.-- after "rod T";

Col. 8, line 58; change "roller" to --collar--.

Signed and Sealed this

Eleventh Day of February, 1992

Attest:

HARRY F. MANBECK, JR.

*Attesting Officer*      *Commissioner of Patents and Trademarks*